US007014197B2

(12) United States Patent
Baldwin et al.

(10) Patent No.: US 7,014,197 B2
(45) Date of Patent: Mar. 21, 2006

(54) CASSETTE-BASED MONEY STORAGE AND TRANSPORTATION SYSTEM AND APPARATUS

(75) Inventors: William C. Baldwin, Costa Mesa, CA (US); Peter Raymond Modler, Pacific Palisades, CA (US)

(73) Assignee: Reldom Corporation, Signal Hill, CA (US)

( * ) Notice: Subject to any disclaimer, the term of this patent is extended or adjusted under 35 U.S.C. 154(b) by 37 days.

(21) Appl. No.: 10/405,952

(22) Filed: Apr. 1, 2003

(65) Prior Publication Data

US 2004/0195792 A1     Oct. 7, 2004

(51) Int. Cl.
    *B62B 1/00*     (2006.01)
(52) U.S. Cl. ............................. 280/47.27; 280/47.35; 414/490; 414/491
(58) Field of Classification Search ................ 414/490, 414/491, 444; 280/47.34, 47.35, 47.27, 47.28, 280/47.29; 108/136
    See application file for complete search history.

(56) References Cited

U.S. PATENT DOCUMENTS

| 2,426,995 | A | * | 9/1947 | Gibbs ........................... 312/71 |
| 2,468,115 | A | * | 4/1949 | Saul, Jr. ....................... 312/71 |
| 3,327,655 | A | * | 6/1967 | Mackay ....................... 108/136 |
| 4,243,153 | A | * | 1/1981 | Mitchell ....................... 221/34 |
| 5,322,171 | A | * | 6/1994 | Pingelton et al. .......... 211/59.3 |
| 5,421,481 | A | * | 6/1995 | Fortmann et al. ........... 221/271 |
| 6,035,973 | A | * | 3/2000 | Neal et al. .................. 187/244 |
| 6,123,346 | A |   | 9/2000 | Baldwin .................. 280/47.35 |
| 6,530,740 | B1 | * | 3/2003 | Kim ........................... 414/490 |

* cited by examiner

*Primary Examiner*—Christopher P. Ellis
*Assistant Examiner*—Brian Swenson
(74) *Attorney, Agent, or Firm*—Franklin D. Ubell; Greenberg Traurig LLP

(57) ABSTRACT

A coin bag storage apparatus including a bag storage cassette tower having a compartment sized to store a plurality of bags, one on top of the next, and a spring-mounted platen located within the storage compartment for receiving each of the bags and progressively lowering a first bag into the compartment as a second bag is placed upon the first bag. In response to addition or removal of a bag, the spring-mounted platen is designed to automatically raise or lower the platen by the thickness of a bag. The cassette tower is further adapted to cooperate in an integrated handling and storage system comprising a dolly, a transport cart, and a storage cabinet cooperating to facilitate easy transportation and secure storage of the loaded cassette towers.

26 Claims, 11 Drawing Sheets

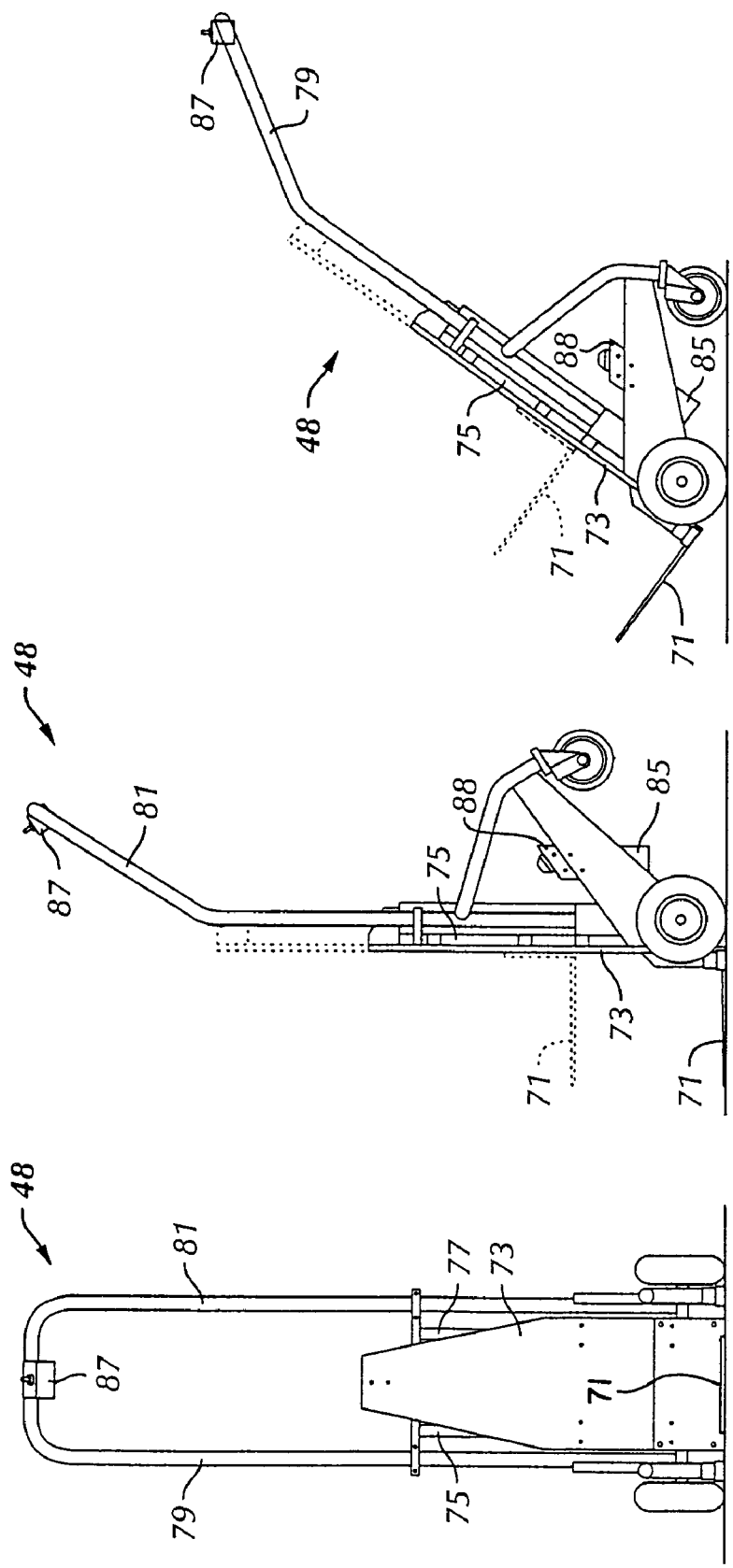

CASSETTE-BASED MONEY STORAGE AND TRANSPORTATION SYSTEM AND APPARATUS

TECHNICAL FIELD

The following disclosure relates generally to bag and money handling apparatus and more particularly to a cassette-based coin bag storage system and apparatus particularly useful in the gaming industry.

DESCRIPTION OF RELATED ART

The storage and handling of large amounts of coin generated in gaming and other environments has continued to be problematic. One effort to address the situation is the provision of improved money transport carts such as illustrated in U.S. Pat. No. 6,123,346.

SUMMARY

The following is a summary of various aspects and advantages realizable according to various embodiments of money handling apparatus according to the invention. It is provided as an introduction to assist those skilled in the art to more rapidly assimilate the detailed design discussion which ensues and does not and is not intended in any way to limit the scope of the claims which are appended hereto in order to particularly point out the invention.

One aspect of the present invention resides in a coin bag storage apparatus comprising a bag storage compartment sized to store a plurality of bags, one on top of the next, and a spring-mounted platen located within the storage compartment for receiving each of the bags and progressively lowering a first bag into the storage compartment as a second bag is placed upon the first bag. Such apparatus may be advantageously designed such that, in response to addition of a bag to the platen, the spring automatically lowers the platen by the thickness of that bag and such that, in response to removal of a bag from the platen, the spring automatically raises the platen by the width of a bag.

Another aspect of the invention is the incorporation of such bag storage apparatus into an integrated bag handling system. One aspect of such a system comprises a wheeled dolly for transporting the bag storage apparatus, the dolly including a powered plate lowerable to a first position for engaging the storage apparatus and, after insertion, raisable to a desired second position. A second component of the integrated bag handling system may comprise a cart having a bed indexed to receive a plurality of bag storage compartments and wherein the powered plate of the dolly is raisable to a height selectable to enable transfer of the compartments on the cart bed. A third component of an integrated bag handling system may include a storage cabinet adapted to store a plurality of cassettes, and a bed movable horizontally in and out of the cabinet.

BRIEF DESCRIPTION OF THE DRAWINGS

The accompanying drawings, which are incorporated in and constitute a part of the specification, illustrate presently preferred implementations and are described as follows:

FIG. 8 is a front elevational view of an illustrative embodiment of a cassette transport dolly.

FIGS. 9 and 10 are side views of the dolly of FIG. 8.

DETAILED DESCRIPTION OF PREFERRED EMBODIMENTS

Figure 4:
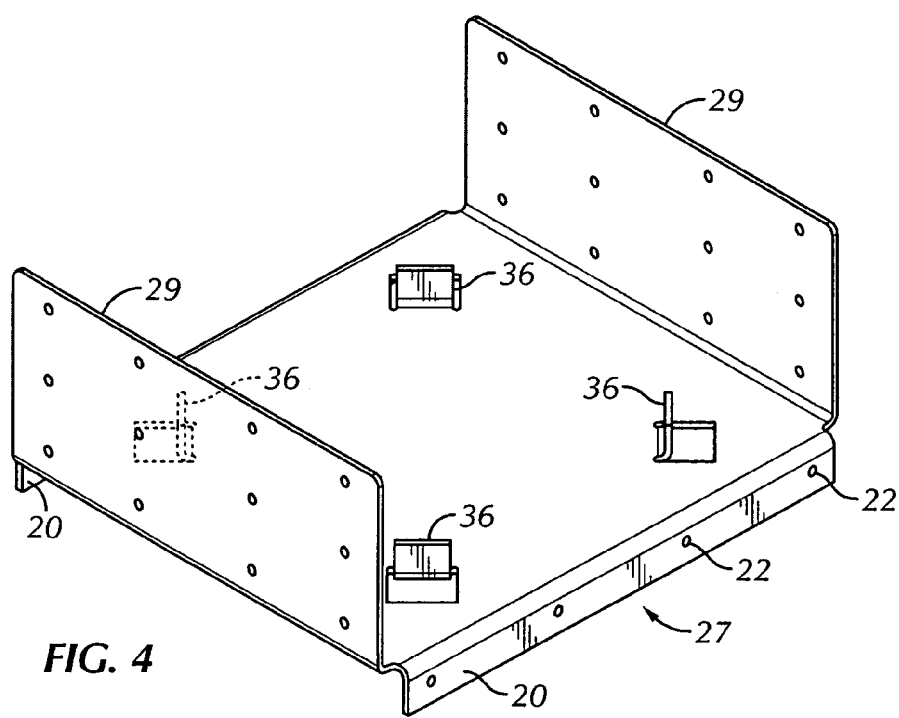
FIG. 4 is a perspective view of a bottom section component of the cassette tower of FIGS. 1–3.

FIGS. 1–4 illustrate a preferred embodiment of a "pop-up" bagged money storage cassette 11. The cassette includes first and second elongated side panels 13, 15. Each of these panels 13, 15 comprise rectangular side surfaces formed at right angles to respective front and back portions 17, 19. The respective front portions 17 and respective back portions 19 define respective v-shaped slots or grooves 23, 25, each opening at the top of the cassette 11 and extending to the top edge of respective side plates 29 of bottom section 27 (FIG. 4). The plates 29 join the side panels 13, 15 together to form a box-like tower structure of rectangular cross section, as seen in the top view of FIG. 3. The side plates 29 may be attached to the panels 13, 15 by suitable fastening means, such as, for example, rivets 31, other similar mechanical fasteners such as bolts, screws, etc., or by welding or other conventional attachment procedures.

A resilient biasing member, preferably a spring 35, is positioned on the bottom section 27 by and within four upwardly extending spring retainer members 36 (FIG. 4). The spring 35 supports a platen member 37 of rectangular cross section, which is sized to ride up and down within the cassette 11. When the cassette 11 is empty, i.e., contains no money bags, the platen 37 resides at its uppermost position, retained there by stop blocks 39.

Figure 5:
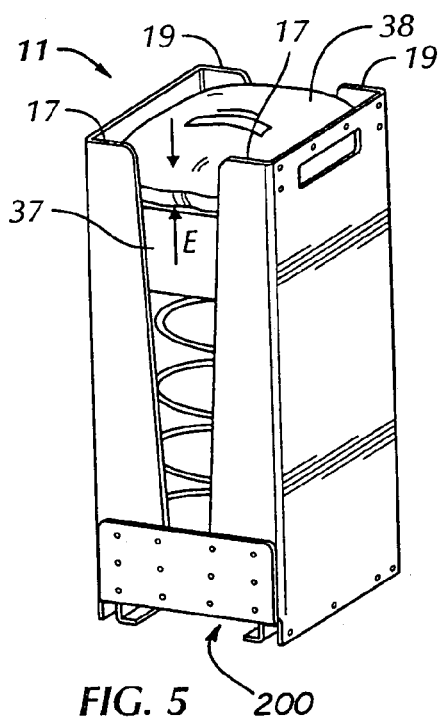
FIGS. 5–7 are perspective views of the cassette tower illustrating the progressive loading of coin bags therein.
Figure 6:
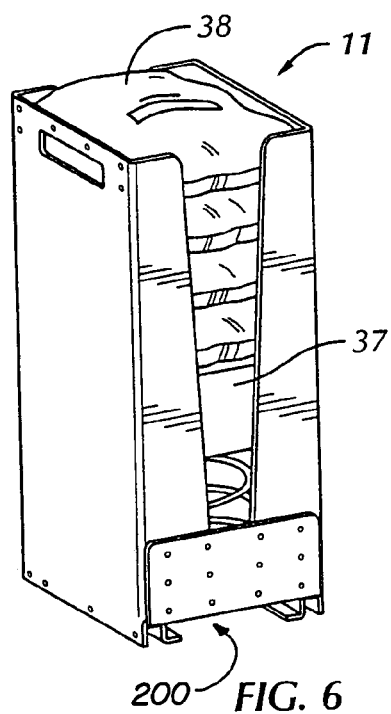
Figure 7:
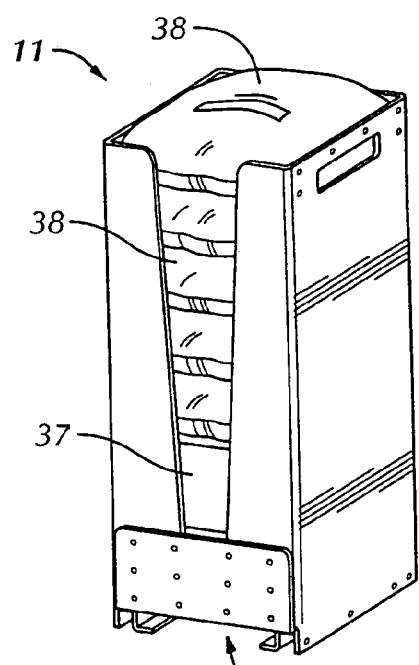

The spring 35 and cooperating components are preferably designed such that a number of coin bags, e.g., 38 (FIG. 5), are stackable on the platen 37, and such that the platen 37 automatically lowers and raises so as to receive each successive bag, while always maintaining the last bag received readily accessible at the top of the cassette 11. FIGS. 5–7 illustrate this stacking feature in an illustrative embodiment which is designed to receive and store up to ten casino coin bags, conventionally weighing 25 pounds each. Thus, when fully loaded, such a cassette 11 stores 250 pounds of coin. As can be seen, the platen 37 automatically lowers by the thickness "E" of one coin bag as another bag is placed on the platen, such that a top bag is always readily accessible.

Figure 1:
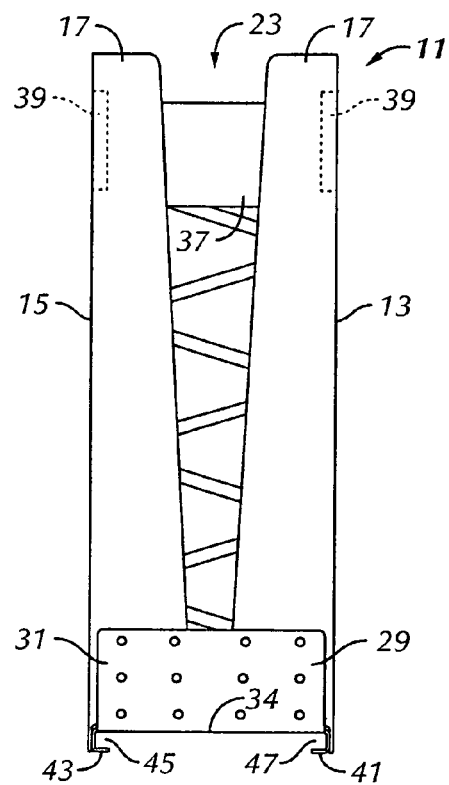
FIG. 1 is a front elevational view of a cassette coin bag storage tower according to a preferred embodiment of the invention.
Figure 2:
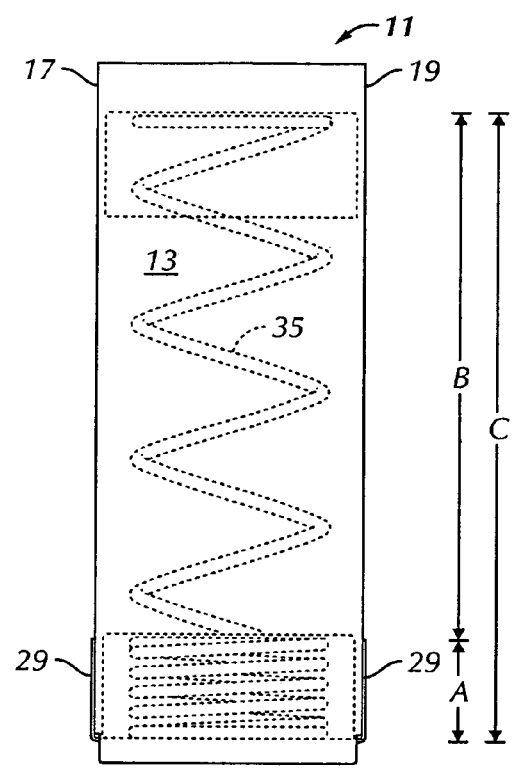
FIG. 2 is a side elevational view of the cassette tower of FIG. 1.
Figure 3:
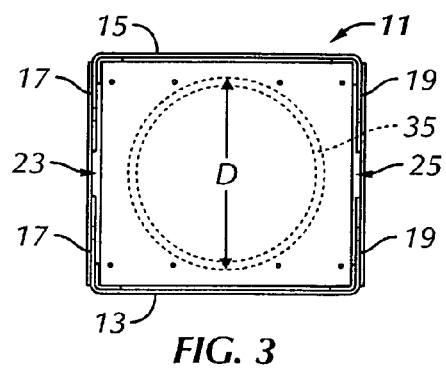
FIG. 3 is a top view of the cassette tower of FIG. 1.

Such operation requires special attention to the design of the spring 35 and cooperative dimensioning of the cassette 11. For example, in an embodiment accommodating ten 25 lb. bags, dimensions "A," "B" and "C" in FIG. 2 are 4.4 inches, 22.50 inches, and 26.94 inches, respectively. In the illustrative preferred embodiment, the spring 35 is a coil spring, and Dimension "A" is a maximum allowed compression dimension preferably selected so that the spring 35 is not compressed so much as to be overstressed during operation. The dimension "A" may be selected, for example so that the spring 35 experiences 80% of its maximum stress. Specifications for the spring 35 in this embodiment include an outside diameter "D" of 8.25 inches ±⅛ inch and a spring rate of 9 to 11 pounds with a free length of 29.30 inches. Many variations of such dimensions and specifications are to be expected in various alternate embodiments.

As may be further noted, the bottom section 27 preferably includes respective flanges or lips 20 at opposite ends thereof and downturned at 90 degrees. The lips 20 may rest on the floor or other surface and may serve to mount respective guide-forming members, such as L-shaped members 45, 47 illustrated in FIG. 1. Such guide-forming members may have other shapes; for example, respective channels of U-shaped cross section. Attachment of such guide members is facilitated by holes, e.g., formed in lips 20.

The cassette 11 is preferably adapted to be picked up, lifted, and transported by a powered cassette lifter 48 illustrated in FIGS. 8 to 11. The lips 20 and guide members comprise a plate receiving slot 200 which if present, may facilitate such operation.

As shown, the cassette lifter 48 is a three-wheeled dolly-like apparatus having a pick-up plate 71 perpendicularly mounted to a drive plate 73. The drive plate 73 is mounted for up and down movement on first and second rods 75, 77 mounted parallel to the side support rails 79, 81 of the lifter apparatus 48. An electric linear actuator 85 is suitably mounted in the base of the lifter 48 and is manually activatable by a switch 87 (FIG. 11) on the handle of the apparatus 48 to vertically raise and lower the drive plate 73 and attached pick-up plate 71. The linear actuator 85 (FIG. 9) is preferably powered by a battery 88.

Figure 11:
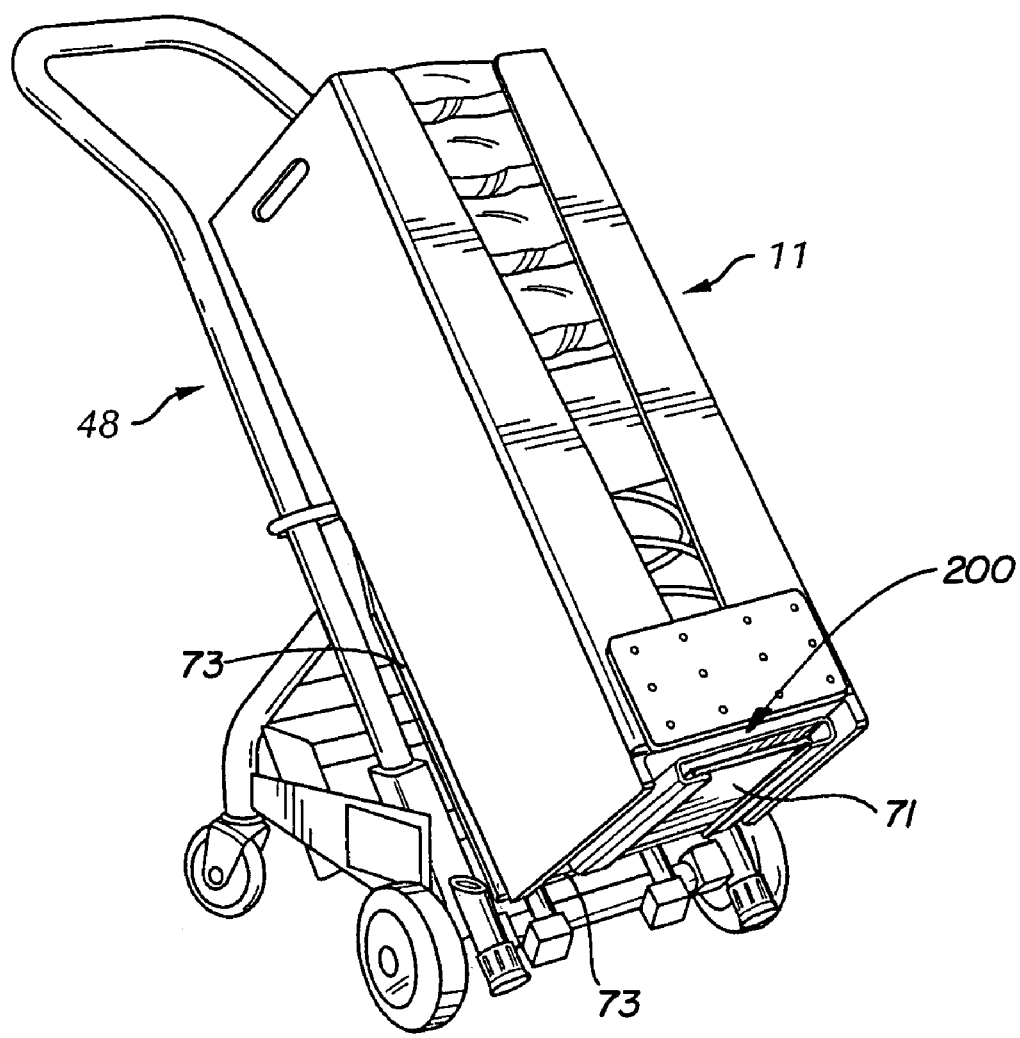
FIG. 11 is a perspective view of a dolly according to FIG. 8.

Thus, a fully loaded cassette 11 may be picked up by the lifter 48 as illustrated in FIG. 11 and moved adjacent to a transport or storage apparatus and then raised up to a height where the cassette 11 can be inserted into the apparatus. FIGS. 12–15 and 16 show illustrative embodiments of such storage apparatus in the form of a powered cassette transport 90, and a cassette indexing storage compartment 120, respectively.

Thus, a fully loaded cassette 11 may be picked up by the lifter 48 as illustrated in FIG. 11 and moved adjacent to a transport or storage apparatus and then raised up to a height where the cassette 11 can be inserted into the apparatus. FIGS. 12–15 and 16 show illustrative embodiments of such storage apparatus in the form of a powered cassette transport 90, and a cassette indexing storage compartment 120, respectively.

Figures 12, 13:
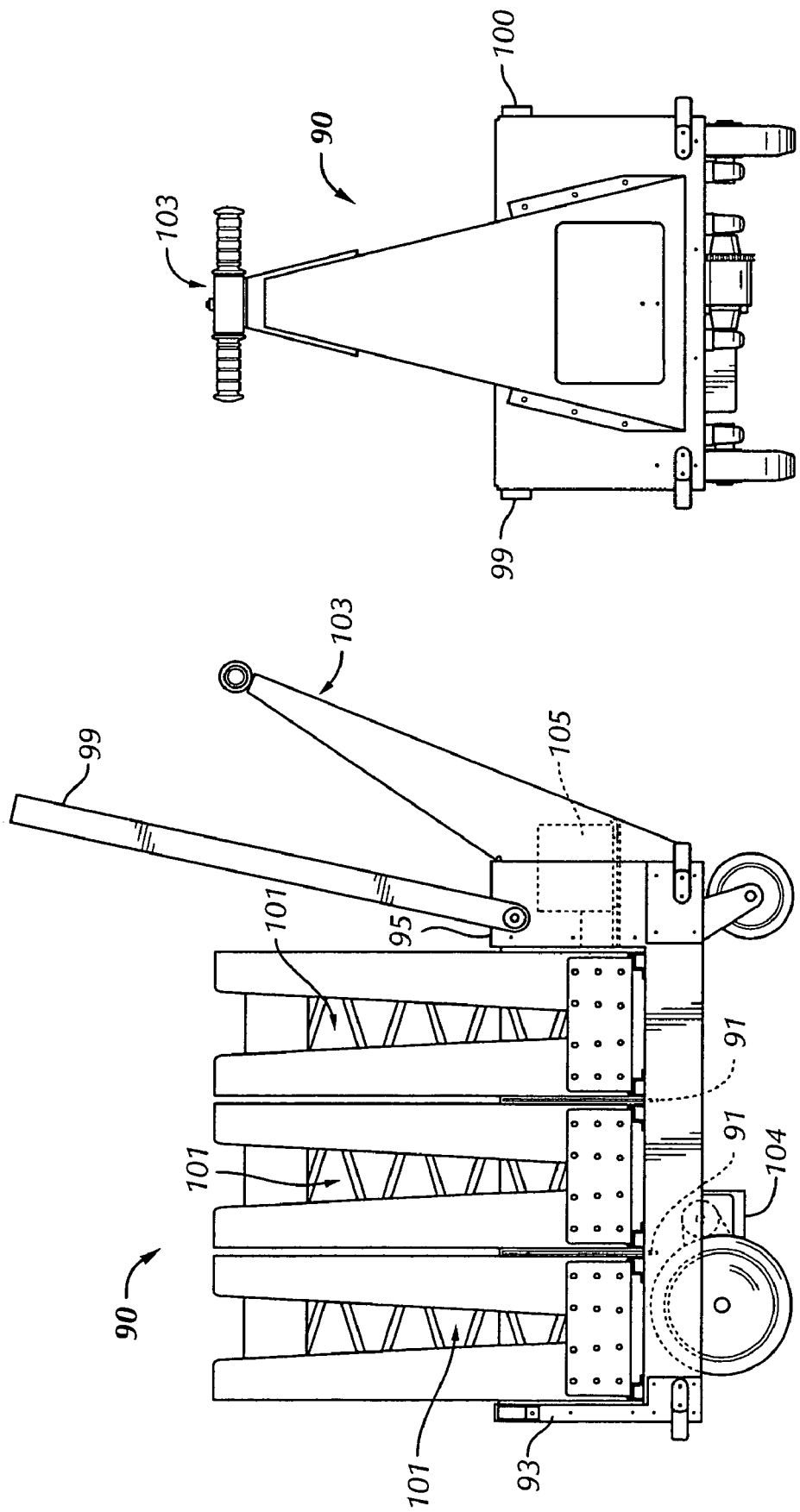
FIG. 13 is a rear view of the cart of FIG. 12.
Figure 14:
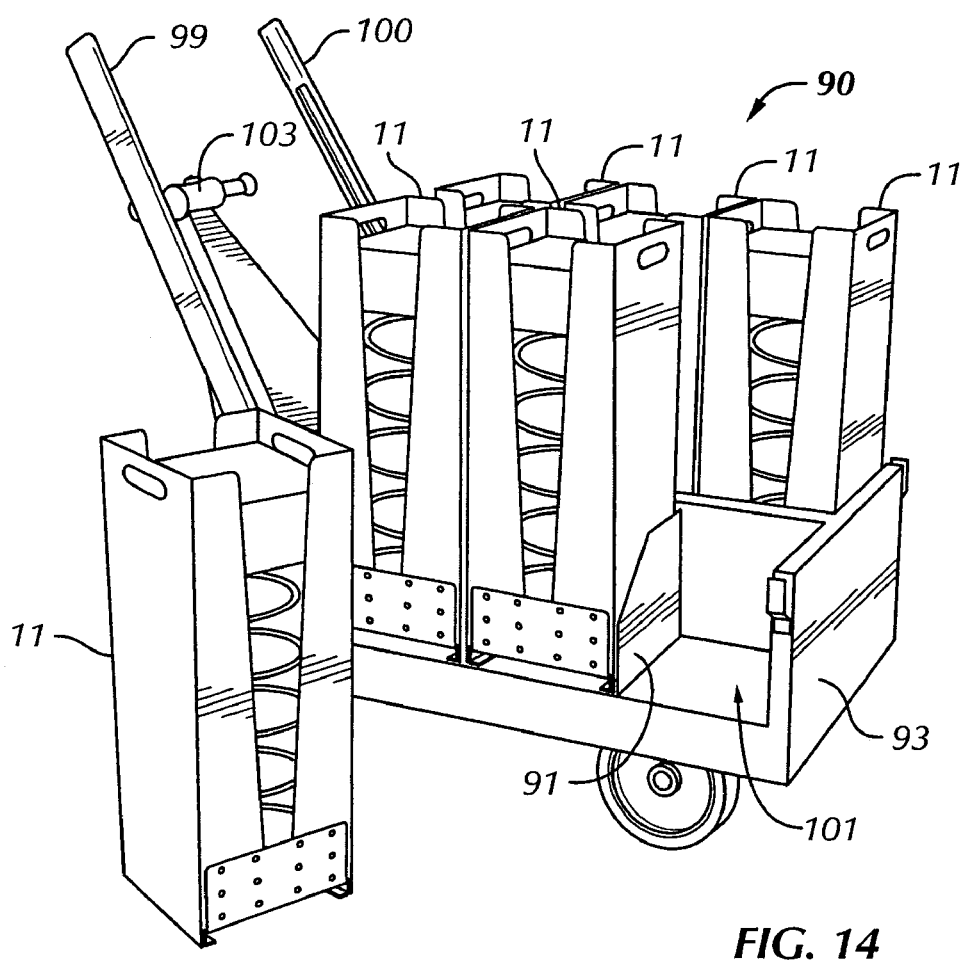
FIG. 14 is a perspective view of a cart according to FIG. 12.

The powered cassette transport 90 illustrated in FIGS. 12–13 accommodates six cassettes, and includes suitable guide plates 91 located between end plates 93, 95 so as to define respective cassette storage positions. Retractable locking side rails 99, 100 are preferably provided to secure or lock the cassettes 11 in position once they are loaded. The cassette lifter 48 is thus designed such that it can lift a cassette 11 to the proper height to permit a cassette 11 to be easily inserted or installed in a selected receptacle, e.g., 101, on the cassette transport 90. The cassette transport 90 is powered by conventional means, such as an electric motor drive 104 with controls conveniently located on a handle 103. An illustrative drive train comprises a motor gearbox (24V, 11.68 A, 128.7 rpm, 127.4 lbs.) as available from Rae Corporation, a differential drive model 100-021A as available from Tecumseh Products, and a pair of 8.0" dia. by 2.0" wide drive wheels, available from R&K Products.

A suitable on board battery charger 105 may be provided so that the unit may be simply plugged-in to recharge the batteries supplying power to the electric motor 104. Optionally, the electric drive may be omitted in favor of manually pushed operation. With a ten cassette system as described above, the transport 90, when fully loaded, carries six cassettes 11 having a total weight of 1,500 pounds. In one illustrative application, cassettes can be located at desired locations throughout a casino and then picked up when convenient by a transport 90 operated by one individual.

Figure 16:
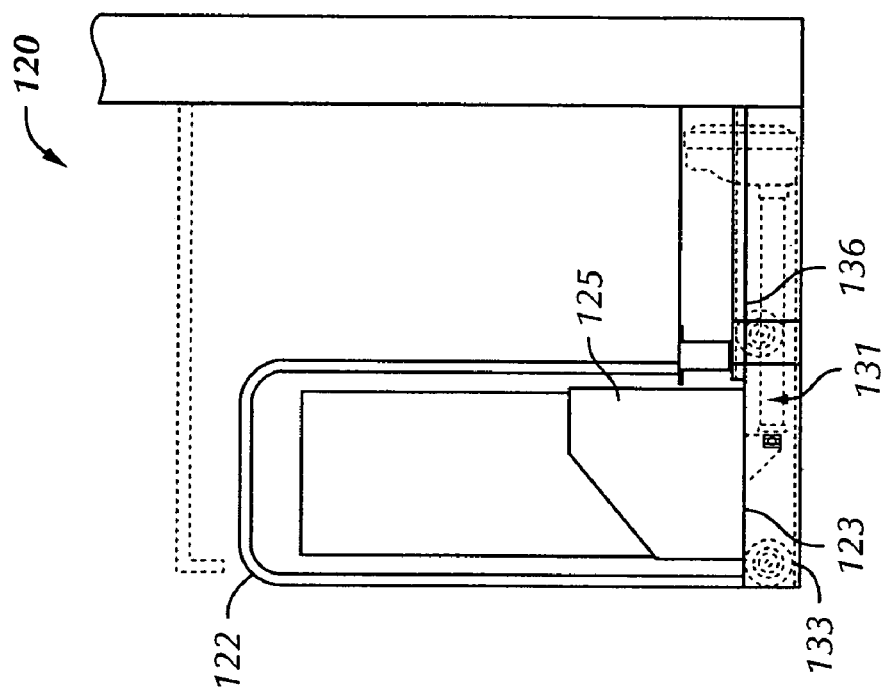
FIG. 16 is a side sectional view of the storage compartment of FIG. 15.
Figure 15:
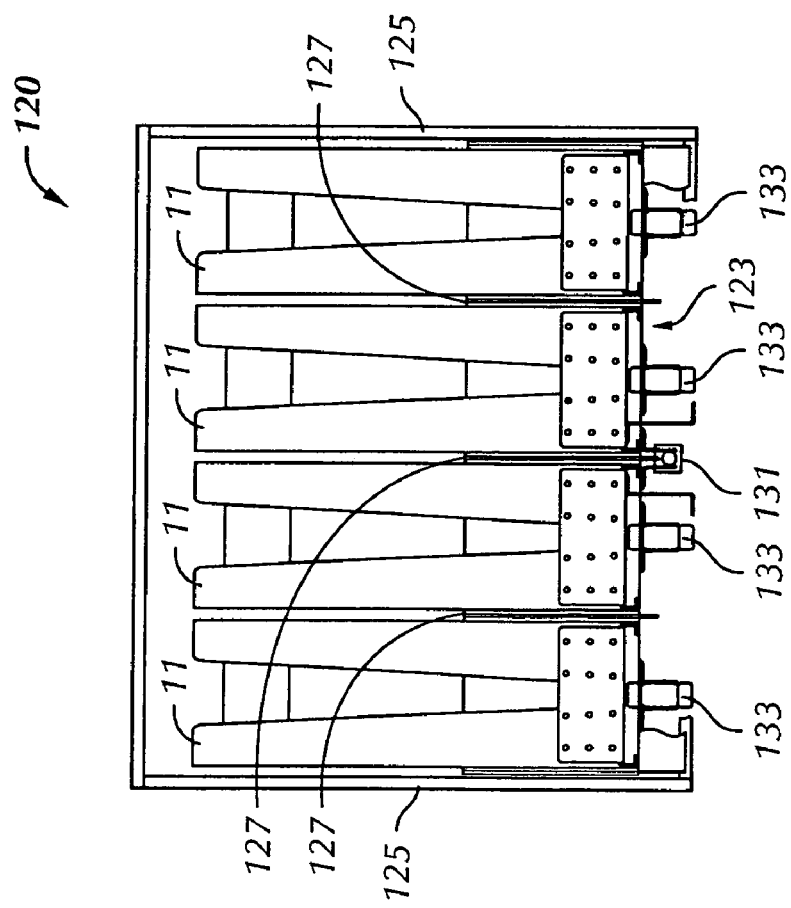
Figure 17:
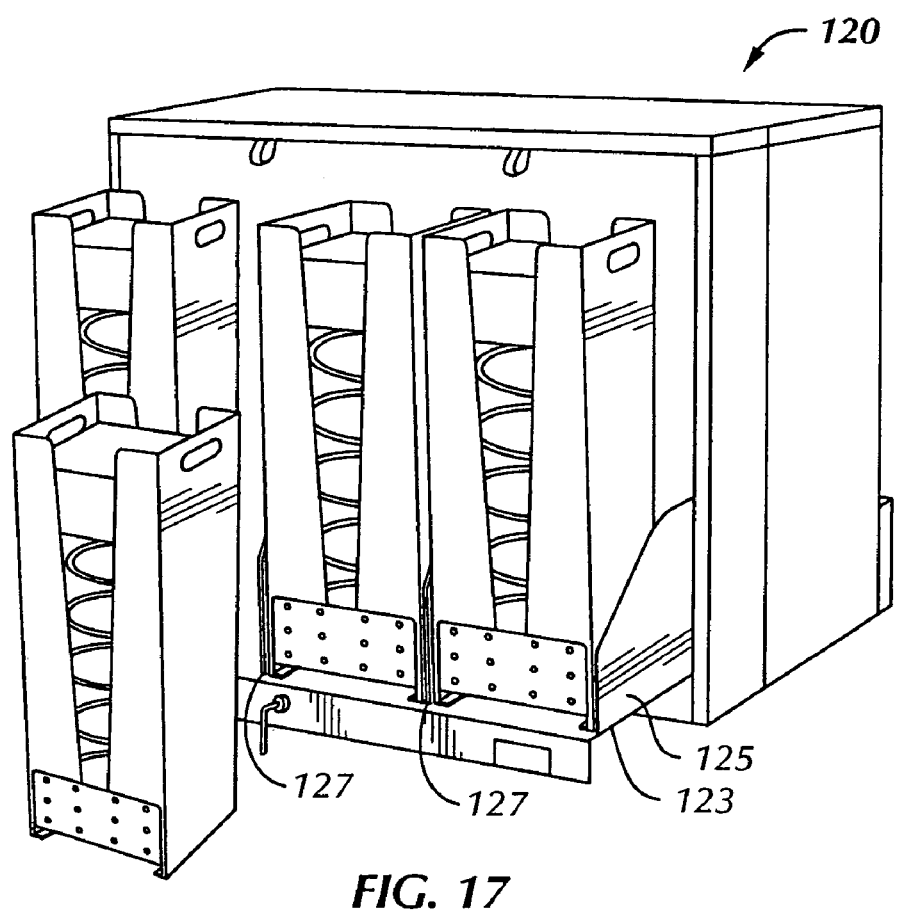
FIG. 17 is a perspective view of a storage compartment according to FIG. 15.

The cassette indexing storage cabinet 120 shown in FIGS. 15–17 is a rectangular metal cabinet with a roll-up door 122 or other suitable front cover. The roll-up door 122 may be a commercially available or custom made unit composed, for example, of pivotable interlocking extruded aluminum segments. After opening the door 122, an indexing carriage 123 is activatable to move out of the cabinet to an extended position as illustrated in FIG. 17 wherein a cassette lifter 48, such as illustrated in FIGS. 8–10, may be used to raise a cassette 11 to an appropriate height for placement on the carriage 123. The carriage 123 includes a horizontal base plate 134, on which are mounted a plurality of end plates 125 and divider plates 127, suitably spaced to index, i.e., define the storage location of, a plurality of cassettes 11.

After cassette loading, the carriage 123 may be retracted to return the installed cassettes 11 to a stored and locked position with the front cover 122 closed. In the illustrative embodiment of FIG. 16, an electric linear actuator 131 is employed to drive the carriage 123 in and out of the storage cabinet 120. To facilitate extension and retraction, the carriage 123 includes suitable rollers or wheels 133, 143.

Figure 18:
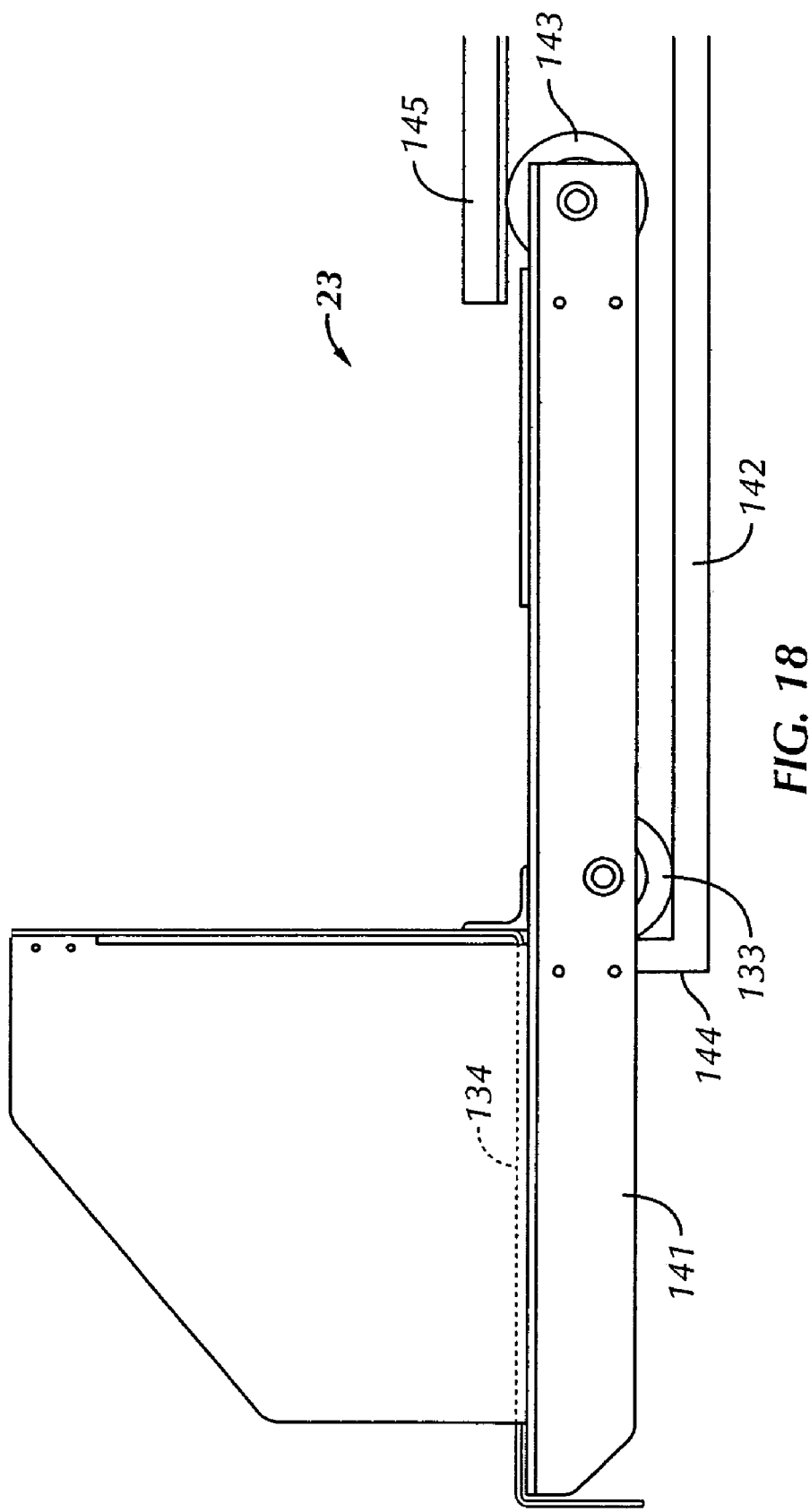
FIG. 18 is a broken out side view schematically illustrating design of a storage compartment carriage mechanism according to an illustrative embodiment.

FIG. 18 particularly illustrates an advantageous design feature implemented in connection with the illustrative preferred storage cabinet 120. As shown, the carriage mechanism 123 includes a plurality of carriage arms 141, each of which rotatably mounts a respective wheel 133. Each wheel 133 rides in and out on a respective lower rail or track 142, limited by a front stop 144. The horizontal base plate 134 is attached to the top of the carriage arms 141.

At the rear of each arm 141 is a rotatably mounted guide wheel 143, which rides against an upper guide rail or track 145, positioned in parallel to the lower guide rail or track 142. The construction of FIG. 18 thus provides a cantilevered arrangement wherein the upper guide rail 145 and wheel 143 prevent tipping of the carriage 123 when the cabinet 120 is open and the carriage is in the extended position, placing a large weight suspended over the floor surface.

Figure 20:
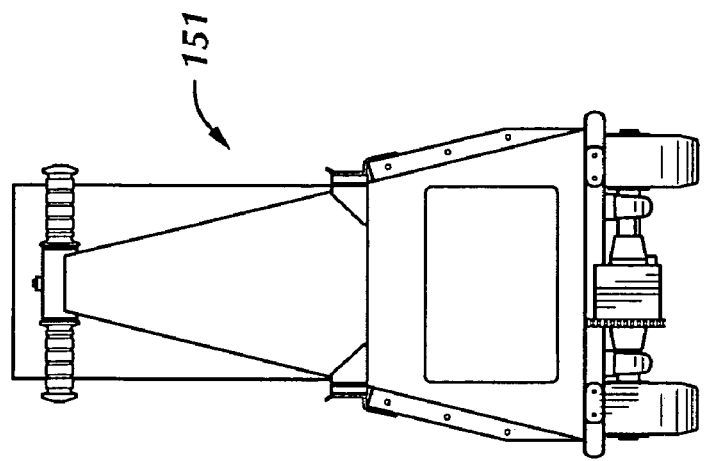
FIGS. 19 and 20 are respective side and front views of an alternative embodiment cassette transport cart.
Figure 19:
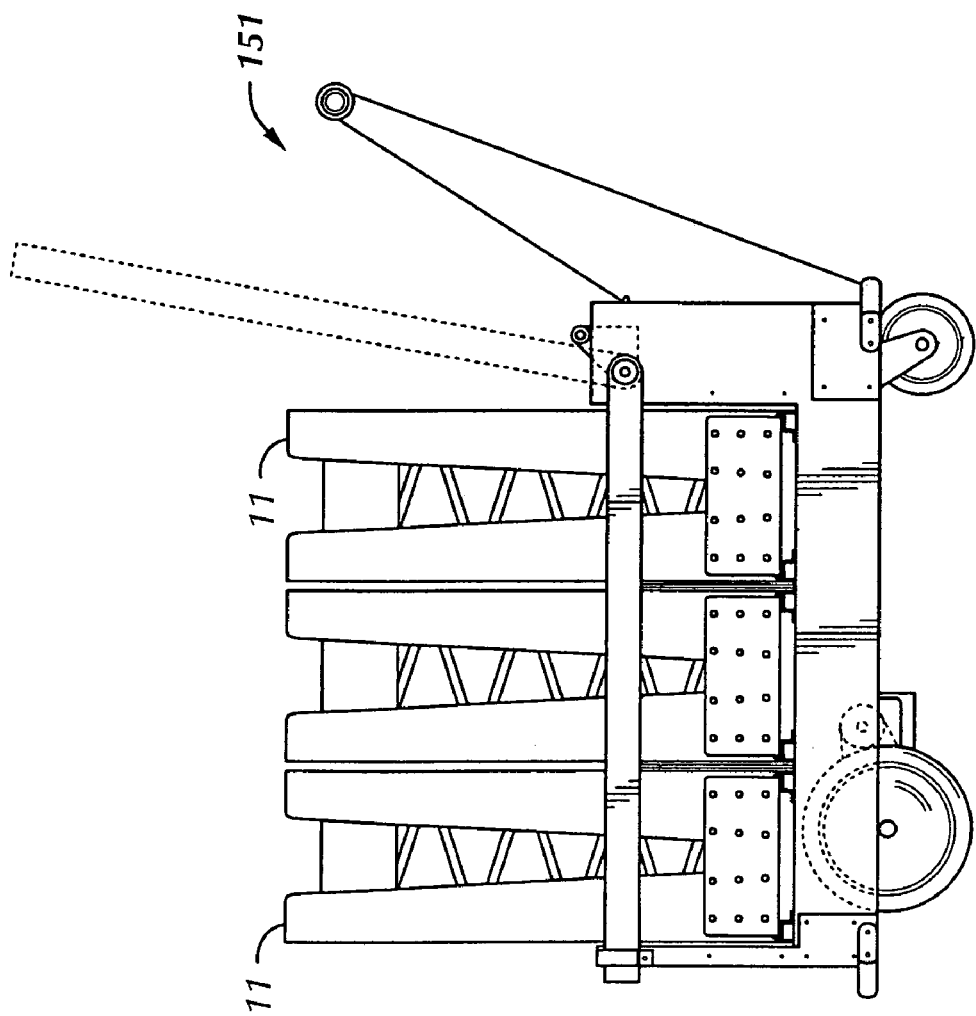

FIGS. 19 and 20 illustrate an alternate embodiment cassette transport cart 151 configured as a narrower "single wide" unit. The cart 151 may be constructed in a manner analogous to that of FIGS. 11–13, with the exception that the cart 151 is made narrower to accommodate a single row of cassettes 11. FIG. 19 particularly illustrates two cassettes in a row; however, in different embodiments, the length of the cart may be selected to accommodate a different number of cassettes; e.g., one, three, or four.

Those skilled in the art will appreciate that the above-described apparatus may provide an integrated coin bag pick-up, transport and storage system, greatly increasing economy, safety, and security in various operating environments. While particularly useful in the gaming industry, the invention may find application in various other environments where heavy, bagged material is involved.

The cassette 11 itself, as well as the other system components, is subject to various modifications and adaptations. For example, separate parts may be formed as a unitary part and vice versa, and dimensions and other parameters and specifications altered to accommodate various sizes and numbers of coin bags. In addition, hydraulic mechanisms, for example, incorporating a hydraulic cylinder, could be substituted for the linear actuator mechanisms discussed in various illustrative embodiments. A pneumatic cylinder with an accumulator device could be arranged to provide the functionality of spring 35.

While the present invention has been described above in terms of specific embodiments, it is to be understood that the invention is not limited to the disclosed embodiments. On the contrary, the present invention is intended to cover various modifications and equivalent methods and structures included within the spirit and scope of the appended claims.

What is claimed is:

1. A coin bag storage apparatus comprising:
   a coin bag storage compartment sized to store a plurality of bags, one on top of the next;
   a spring-mounted platen located within said storage compartment for receiving each of said bags and progressively lowering a first bag into said compartment as a second bag is placed upon said first bag;
   means for transporting a said compartment, said means including a powered plate lowerable to a first position for engaging said compartment and, after engagement, raisable to a desired second position; and
   a plate receiving slot formed at a lower end of said compartment for receiving said powered plate.

2. The apparatus of claim 1 further comprising a vertically extending slot in a side surface of said storage compartment.

3. The apparatus of claim 1 wherein each said bag has a thickness and wherein, in response to addition of a bag to said platen, said spring automatically lowers said platen by the thickness of a bag.

4. The apparatus of claim 3 wherein, in response to removal of a bag from said platen, said spring automatically raises said platen by the thickness of a bag.

5. The apparatus of claim 3 wherein said compartment is sized to stack ten 25-pound coin bags.

6. The apparatus of claim 1 further in combination with a wheeled dolly for transporting a said compartment, said dolly including a powered plate lowerable to a first position for engaging said compartment and, after engagement, raisable to a desired second position.

7. The apparatus of claim 6 further including a plate receiving slot formed at a lower end of said compartment for receiving said powered plate.

8. A coin bag storage apparatus comprising:
   a coin bag storage compartment sized to store a plurality of bags, one on top of the next;
   a spring-mounted platen located within said storage compartment for receiving each of said bans and progressively lowering a first bag into said compartment as a second bag is placed upon said first bag;
   means for transporting a said compartment, said means including a powered plate lowerable to a first position for engaging said compartment and, after engagement, raisable to a desired second position; and
   a cart having a bed indexed to receive a plurality of said coin bag storage compartments and wherein said desired second position includes a height selected to enable said means to position a said compartment for transfer onto said bed.

9. The apparatus of claim 8 wherein said cart comprises a powered cart.

10. The apparatus of claim 8 further including a storage cabinet sized to store a plurality of said compartments, said cabinet including a carriage movable horizontally in and out of said cabinet and wherein said desired height further includes a height selected to enable said means to transfer a said compartment onto a base portion of said carriage.

11. The apparatus of claim 10 further including drive means for driving said carriage in and out of said cabinet.

12. The apparatus of claim 11 wherein said drive means includes an electric linear actuator.

13. A coin bag storage apparatus comprising:
   a coin bag storage compartment sized to store a plurality of bags, one on top of the next;
   a spring-mounted platen located within said storage compartment for receiving each of said bags and progressively lowering a first bag into said compartment as a second bag is placed upon said first bag;
   means for transporting a said compartment, said means including a powered plate lowerable to a first position for engaging said compartment and, after engagement, raisable to a desired second position; and
   a storage cabinet sized to store a plurality of said compartments, said cabinet including a carriage movable horizontally in and out of said cabinet and wherein said desired second position further includes a height selected to enable said means to transfer a said compartment onto a base portion of said carriage.

14. The apparatus of claim 13 further including drive means for driving said carriage in and out of said cabinet.

15. The apparatus of claim 14 wherein said drive means includes an electric linear actuator.

16. The apparatus of claim 13 wherein said carriage includes a plurality of carriage arms each having a pair of wheels disposed to ride between upper and lower tracks.

17. The apparatus of claim 16 wherein a rear one of said wheels is disposed to engage an upper guide track in a manner so as to prevent tipping of the carriage.

18. A coin bag storage apparatus comprising:
   a cassette comprising a coin bag storage compartment sized to store a plurality of coin bags, one on top of the next, said storage compartment having a spring-mounted platen located therein for receiving each of said bags and progressively lowering a first bag into said compartment as a second bag is placed upon it;
   means for transporting said cassette, said means including a powered plate lowerable to a first position for engaging a lower end of said compartment and, after engagement, raisable to a selectable height; and
   a storage cabinet sized to store a plurality of said cassettes, said cabinet including a carriage movable horizontally in and out of said compartment and wherein said selectable height further includes a height selected to enable said means to transfer a said compartment onto a bed portion of said carriage.

19. The apparatus of claim 18 wherein said carriage includes a plurality of carriage arms each having a pair of wheels disposed to ride between upper and lower tracks, wherein a rear one of said wheels is disposed to engage an upper guide track in a manner so as to prevent tipping of the carriage.

20. The apparatus of claim 18 wherein, in response to addition or removal of a bag, said spring automatically raises or lowers said platen by a thickness of that bag, respectively.

21. The apparatus of claim 18 further including means formed in a lower end of said compartment for receiving said powered plate.

22. The apparatus of claim 18 further including a wheeled cart having a first bed indexed to receive a plurality of said cassettes and wherein said selectable height includes a height selected to enable said means to insert a said cassette in position on said bed.

23. The apparatus of claim 22 wherein said cart comprises a powered cart.

24. The apparatus of claim 18 further including drive means for driving said carriage in and out of said cabinet.

25. The apparatus of claim 24 wherein said drive means comprises a linear actuator.

26. A coin bag storage apparatus comprising:

a cassette comprising a coin bag storage compartment sized to store a plurality of coin bags, one on top of the next, said storage compartment having a spring-mounted platen located therein for receiving each of said bags and progressively lowering a first bag into said compartment as a second bag is placed upon it;

means for transporting at least one said cassette and for raising said at least one cassette to a selectable height; and a storage cabinet sized to store a plurality of said cassettes, said compartment including a carriage movable horizontally in and out of said compartment and wherein said selectable height further includes a height selected to enable transfer of a said cassette from said means onto a bed portion of said carriage.

* * * * *